Figure 1:
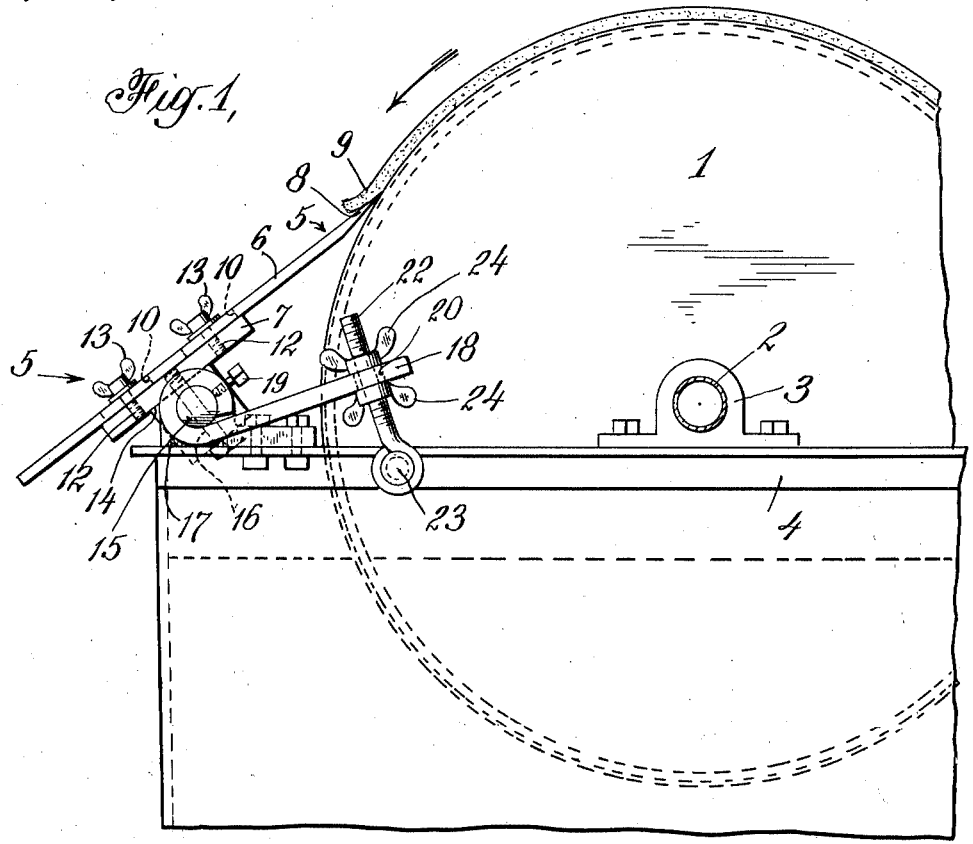

J. S. BATES.
SCRAPER FOR ROTARY FILTERS.
APPLICATION FILED MAR. 8, 1921.

1,415,859.

Patented May 16, 1922.

Inventor
Joseph S. Bates
By his Attorneys
Pennie, Davis, Marvin & Edmonds

UNITED STATES PATENT OFFICE.

JOSEPH SUMNER BATES, OF BRIDGEPORT, CONNECTICUT, ASSIGNOR TO THE NATIONAL ANILINE & CHEMICAL COMPANY, INC., OF NEW YORK, N. Y., A CORPORATION OF NEW YORK.

SCRAPER FOR ROTARY FILTERS.

1,415,859.  Specification of Letters Patent.  Patented May 16, 1922.

Application filed March 8, 1921. Serial No. 450,684.

*To all whom it may concern:*

Be it known that I, JOSEPH S. BATES, a citizen of the United States, residing at Bridgeport, in the county of Fairfield, State of Connecticut, have invented certain new and useful Improvements in Scrapers for Rotary Filters; and I do hereby declare the following to be a full, clear, and exact description of the invention, such as will enable others skilled in the art to which it appertains to make and use the same.

This invention relates to a device for scraping compacted or agglomerated material from the surface of a rotating drum, such as the rotating drum of a filter of the rotary type, or the calendering rolls used in paper making. Such scraping knives when used in scraping calendering rolls are commonly called "doctors". The apparatus here shown, however, is more particularly adapted for scraping compacted material from the surface of a rotary drum filter.

An important object of the invention is to design a mounting for a scraping knife so that the scraping knife may be moved toward and away from the surface of the filter and held in any adjusted position so that the degree of scraping action may be adjusted to a nicety and so that the scraping knife may be held just out of contact with the fabric material covering the outside surface of the filter. Another object of the invention is to provide a knife mounting in which the knives may be quickly swung out of contact with the surface of the filter and held there. A third object is to provide a scraping device which is so adjustable that it may be set to follow variations in diameter of the filter, if for any reason such variations are met with. A fourth object is to provide a mounting for a series of individual scraping knives, so designed that knives of different lengths may be used at the same time and yet each knife adjusted to its proper scraping action. Further advantages and improved results of the invention will be apparent from the following more detailed description.

The improved apparatus of this invention comprises a scraping element with a scraping edge substantially parallel to the axis of the filter, so mounted that the scraping element is rotatable about an axis parallel to the axis of the filter, toward and away from the surface of the filter. This arcuate movement of the scraper is controlled by threaded controlling means and cooperating nuts, which enable it to be firmly set in any desired proximity to the surface of the filter and held there, the exact degree of scraping action being easily regulatable by the threaded controlling means.

The scraping element comprises a series of knives, each individually adjustable in its own plane toward and away from the surface of the filter. Each knife is individually removable and individually adjustable, so that if for any reason the diameter of end of the rotary filter is not quite the same as the diameter of the other end, the knives at the smaller end may be moved further toward the filter so as to exert the proper degree of scraping action. The design of the scraper was made and the adjustable features introduced with a view to making it possible to compensate for any unevenness in the surface of the agglomerated filter cake whether caused by unevenness in the surface of the drum itself or lack of uniform thickness in the cake of filtered material, which latter condition is frequently met with even though the surface of the drum be perfectly true.

Both the arcuate adjustment of the scraping element as a whole and the individual adjustment of each scraping knife provide a structure in which scraping knives of various lengths may be used, which is a useful feature, because the knives need to be replaced and resharpened occasionally, resulting in the older knives becoming shorter than the others.

Figure 2:
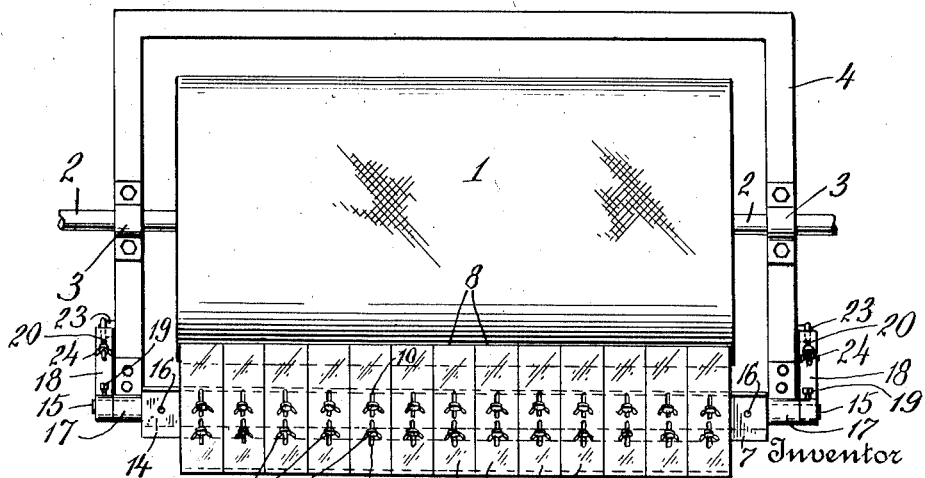

A preferred embodiment of the invention as applied to a rotary filter of the Oliver type is illustrated in the accompanying drawings, in which Fig. 1 is a side view in section of the scraper and associated parts of the filter, the filter itself being more or less diagrammatically shown; and Fig. 2 is a plan view of the apparatus on a smaller scale.

The filter drum 1 is mounted on an axis 2 which is rotatable in bearings 3 on a suitable frame work 4. The cylindrical surface of the drum is covered with an appropriate filtering material, such as canvas. Further details of the filter, such as the suction applying means, etc., form no part of this invention, and need not be described.

The scraping element, indicated generally at 5, is composed of a series of scraping knives 6 which are mounted side by side on a knife supporting plate 7. The scraping edges 8 of the knives are arranged to form a continuous scraping edge parallel to the axis of the filter. The agglomerated or compacted material that is scraped off by the scraping element is indicated at 9. Each scraping knife 6 is provided with a pair of slots 10 extending lengthwise of the knife. Through each of these slots 10 there projects a threaded stud 12, which studs are firmly mounted in the knife supporting plate 7. Wing nuts 13 cooperate with these studs to firmly clamp each scraping knife to the supporting plate 7. The mounting means for these knives just described evidently gives an adjustment of the knives in their own plane, toward and away from the surface of the filter. Such individual adjustment of the knives gives a regulation by which the proper degree of scraping action may be obtained at all points along the filter, even if the filter drum should vary in diameter. Furthermore, individual knives may be readily removed for replacement or resharpening without affecting the other knives.

The scraping element 5 is movable in an arc toward and away from the surface of the filter about an axis parallel to the axis of the filter by means that will now be described. The knife supporting plate 7 is fixed to the flattened face 14 of the shaft 15 by bolts 16, the ends of the shaft being journaled in bearings 17 supported on the framework 4. The shaft 15 is substantially parallel to the axis of the filter, and is adjustable about its own longitudinal axis by adjusting means which will now be described.

To each end of the shaft 15 is fixed an adjusting arm 18, one end of the arm being bent around the shaft 15 and keyed thereto by a set screw 19. The outer end of the arm 18 is slotted at 20; a threaded shaft 22, pivoted to the frame 4 at 23 passes through the slot. Upper and lower wing nuts 24 work on the threaded shafts 22 to clamp the adjusting arms between them. From the adjustment just described it will be apparent that the scraping element 5 may be moved out of scraping engagement with the filter and held there, and that it may be moved as close to the surface of the filter as may be desired, a very nice adjustment of the scraping action being obtained by the setting of the arm 18, by the use of the wing nuts 24. Since the surface of the filter is covered with more or less fragile fabric material, such as woven wire, felt or cloth, the scraper must not come into actual contact with such material, but should be held just clear of it so as to take off the agglomerated material without injuring the fabric. Even with such fine adjustment, however, the scraper 5 is firmly and rigidly held for efficient scraping action by the rigid positioning of the adjusting arm 18.

The preferred embodiment of the invention has been illustrated in considerable detail; the invention, however, is not limited to the particular embodiment shown, but may be carried out by other mechanical means.

I claim as my invention:—

1. A scraping device for scraping agglomerated material from the surface of a cylindrical rotary filter, comprising a scraping knife, means for adjusting the scraping knife in its own plane toward and away from the surface of the filter, and means for angularly adjusting the scraping knife about an axis substantially parallel to the axis of the filter and for holding it in any desired adjusted position.

2. A scraping device for scraping agglomerated material from the surface of a cylindrical rotary filter, comprising a scraping knife composed of a plurality of scraping elements, each individually adjustable in its own plane toward and away from the surface of the filter for compensating for irregularities in the surface of the filter, and means for angularly adjusting the scraping knife about an axis parallel to the axis of the drum for holding it in any adjusted position.

3. A scraping device for scraping agglomerated material from the surface of a cylindrical rotary filter, comprising a rotatably mounted shaft extending parallel to the axis of the filter, an adjusting arm keyed to said shaft, means for setting said arm in any desired angularly adjusted position, a knife supporting plate mounted on the shaft, a plurality of scraping knives carried by said arm, and means for individually adjusting each of said knives in its own plane toward and away from the surface of the filter.

4. A scraping device for scraping a rotary drum, comprising a shaft extending substantially parallel to the axis of the drum, a scraping knife carried by said shaft, an adjusting arm, provided with an aperture, keyed to said shaft, a threaded bolt passing through the mentioned aperture, and nuts carried on the bolt on opposite sides of the arm, for holding the arm in adjusted position.

5. A scraping device for scraping a rotary drum, comprising a shaft extending substantially parallel to the axis of the drum, a plate carried by the shaft, a scraping knife carried by the plate, the knife being mounted to permit adjustment in its own plane, and means for angularly adjusting the knife about an axis substantially parallel to the axis of the drum.

In testimony whereof I affix my signature.

JOSEPH SUMNER BATES.